Oct. 4, 1966  J. E. SCHWANINGER  3,276,688

TRANSFER DEVICE FOR COUNTER

Filed April 29, 1965  3 Sheets-Sheet 2

INVENTOR.
JOHN E SCHWANINGER
BY
J. B. Felshin
ATTORNEY.

Oct. 4, 1966  J. E. SCHWANINGER  3,276,688
TRANSFER DEVICE FOR COUNTER
Filed April 29, 1965  3 Sheets-Sheet 3

INVENTOR.
JOHN E. SCHWANINGER
BY
J.B. Felshin
ATTORNEY.

3,276,688
Patented Oct. 4, 1966

United States Patent Office 3,276,688
TRANSFER DEVICE FOR COUNTER
John E. Schwaninger, Plainview, N.Y., assignor to Martin Machine Co., Inc., Flushing, N.Y., a corporation of New York
Filed Apr. 29, 1965, Ser. No. 451,831
1 Claim. (Cl. 235—143)

This invention relates to counters, indexing devices and position read-out indicators sensitive to angular rotation of a rotary member.

An object of this invention is to provide a device of the character described which may be operated at high speed. In one aspect of the invention the input may be imparted to a wheel and in another aspect of the invention the input is imparted to a shaft.

Another object of this invention is that the device embodying the invention may serve as a counter, an indexing device, a position read-out device, and may at the same time actuate switches in a manner corresponding to the angular rotation of same part or parts of the device.

Yet another object of this invention is to provide a strong and durable device of the character described which shall be relatively inexpensive to manufacture and assemble, which shall be smooth and positive in operation and yet practical and efficient to a high degree in use.

Other objects of this invention will in part be obvious and in part hereinafter pointed out.

The invention accordingly consists in the features of construction, combination of elements, and arrangement of parts, which will be exemplified in the construction hereinafter described, and of which the scope of invention will be indicated in the following claims.

FIG. 1a is a partial view similar to a portion of FIG. 1, showing a modified construction but omitting one of the cams;

FIG. 4 is a transverse sectional view of a device embodying a modified form of the invention, taken on line 4—4 of FIG. 5;

FIG. 5 is a cross-sectional view taken on line 5—5 of FIG. 4.

Figure 1:
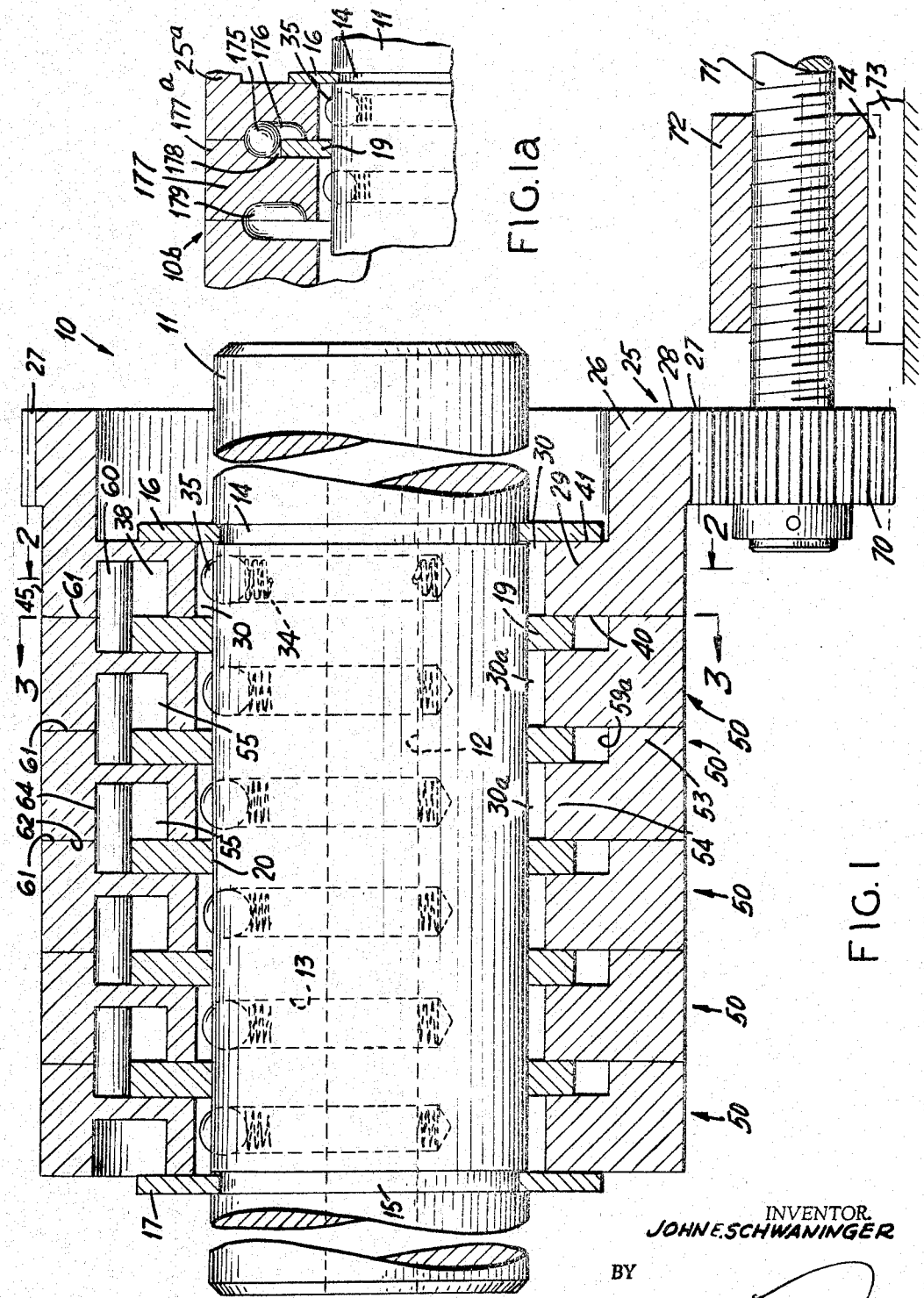
FIG. 1 is an axial cross-sectional view of a device embodying the invention, taken on line 1—1 of FIG. 2.
Figure 2:
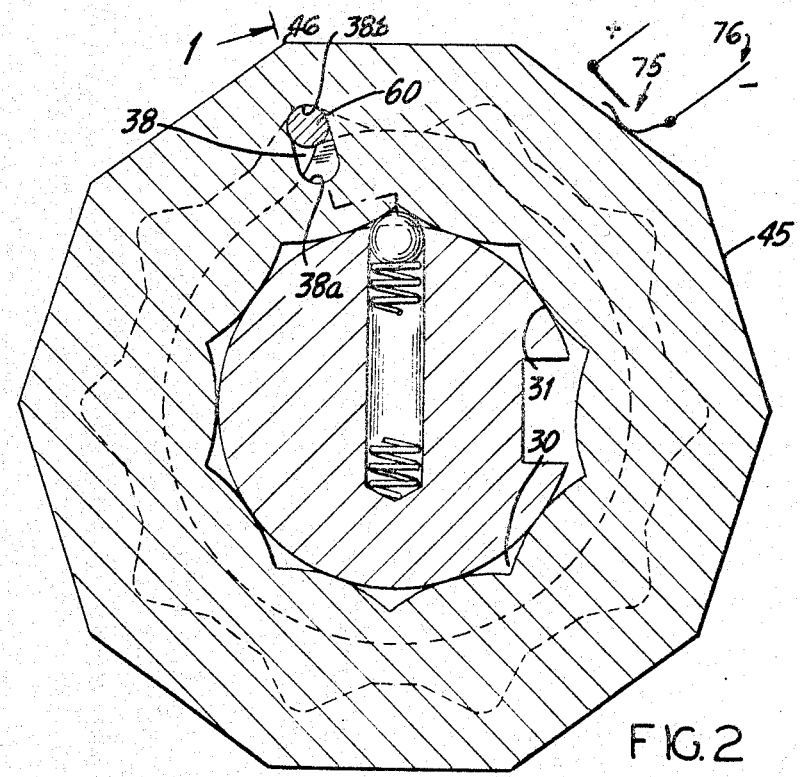
FIG. 2 is a cross-sectional view taken on line 2—2 of FIG. 1.
Figure 3:
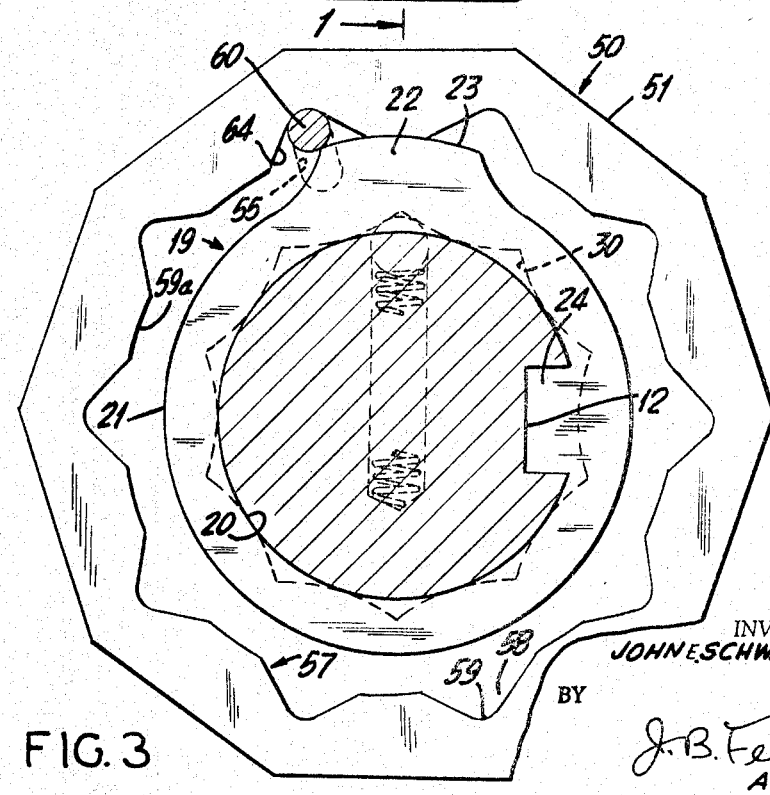
FIG. 3 is a cross-sectional view taken on line 3—3 of FIG. 1.

Referring now in detail to FIGS. 1, 2 and 3 of the drawing, 10 designates a device embodying the invention.

The same comprises a fixed shaft 11 formed with a longitudinal keyway 12 and with a plurality of equally spaced similar diametric blind bores 13 spaced from the keyway. Shaft 11 is formed with a pair of spaced annular grooves 14 and 15. The bores 13 are all located between said annular grooves. On said shaft 11 and in said grooves 14, 15 are annular stop, retainer or abutment rings 16, 17 respectively. On said shaft are a plurality of similar cam members 19, there being one such cam member between each pair of bores 13. Each cam member 19 has a central bore 20 through which shaft 11 passes, an outer part circular edge 21, and a cam bump portion 22 having a part circular outer edge 23. Each cam member 19 also has a key or tongue 24 slidably projecting into the keyway 12, to prevent rotation of the cam member relative to shaft 11.

Rotatably mounted on shaft 11 and between ring 16 and the next adjacent cam member and around said ring, is a first counter or indexing wheel or member 25. Member 25 comprises an outer annular flange portion 26 surrounding ring 16 and provided with outer gear teeth 27 adjacent its outer edge 28. Extending from one end of said flange portion 26 is an annular web portion 29 provided at its inner edge with ten equiangularly spaced wedge shaped notches 30. Any number of such notches may be employed. For a decimal system counter, ten notches are used. Between the notches 30, as at 31, said web portion 29 rotatingly contacts the outer surface of shaft 11.

Web 29 is in the plane of bore 13. In the bore 13 is a coil compression spring 34 pressing an indexing ball 35 into a notch 30. Said web 29 is further formed with a radial slot 38 having curved inner and outer ends 38a, 38b respectively. Counter member 25 has a flat face 40 at its end opposite surface 28. Surfaces 28 and 40 are in planes perpendicular to the axis of shaft 11. Slot 38 extends to surface 40 but terminates short of face 41 of web 29 opposite to said surface 40. The inner end 38a of slot 38 is disposed radially outwardly of notches 30. Member 25 at its outer rim and between gear teeth 27 and face 40 may have the shape of a regular polygon with as many flat facets or sides 45 as there are notches 30. For a decimal system counter, there would be ten flat facets 45. A radial line through each notch 30 bisects a facet 45. A radial line bisecting slot 38 passes between a pair of adjacent notches 30 and through an apex 46 between a pair of adjacent facets 45.

On said shaft 11 are a plurality of similar counter members 50, there being one such counter member between each pair of cam members 19 and a last counter member between the last cam member 19 and the abutment or retainer ring 17.

Each counter member 50 has outer facets 51 similar to the facets 45. Each counter member 50 has inner notches 30a similar to notches 30 and portions 31a (similar to portions 31) between said notches 30a, to contact the outer surface of shaft 11. Each of said counter members 50 comprises an outer flange portion 53 and a web 54 (formed with said notches 30a and shaft contacting portions 31a), and engaging cams 19 on opposite sides thereof, or as in the case of the last counter member 50 of the series, between one cam 19 and ring 17. Said webs 54 are each formed with a slot 55 similar to slot 38 of member 25.

Flange 53 of each counter member 50 surrounds a cam member 19, and has an inner edge 57 comprising ten wedge shaped notches 58 (same number as there are notches 30 in each of said counter members) rounded at their apexes 59. Between the notches 58 are concave edges 59a arranged in a circle whose center coincides with the axis of shaft 11. The outer end of each slot 38 and 55 is shaped similarly to an apex 59 of a notch 58 and merges therewith. A cylindrical pin 60 in slot 38 of counter member 25 extends beyond face 40 and projects into the cavity in the next adjacent counter member 50 which receives cam 19, and said projecting end of said pin 60 contacts the rounded apex 59 of a notch 58 of the inner edge 57 of said flange. The outer face 61 of the first counter member 50 contacts face 40 of counter member 25. The outer faces 61 of the outer counter members contact opposed faces 62 of said counters.

The radius of edge 23 of cam member 19 is less than the radial distance of the bottoms 59 of notches 58 by slightly more than the diameter of pins 60, so that a pin 60 in a notch 58 can move around the outer edge 23 from one side of cam bump 22 to the other. The radial distance from the inner edge portions 59a to the axis of the shaft 11 is greater than the radius of edge 21 of the cam by slightly more than the diameter of pin 60. Thus if wheel or counter member 25 is rotated in a counterclockwise direction, looking at FIG. 3, pin 60 will ride down one inclined edge 64 of the notch 58 in which it is located, and then will be carried around between edge 21 of cam 19 and the edges 59a and/or notches 58 of the next adjacent counter wheel or member 50, as it is free to ride up and down in its slot 38. As wheel 25 rotates, ball 35 will click into the notches 30.

The pin will thus go around from one side of the cam hump 22 to the other side without rotating the next adjacent cam wheel 50. However, when the pin 60 comes to the opposite side of cam hump 22, at the right side of the hump looking at FIG. 2, it will be moved up into notch 58 at said opposite side of said hump. Rotation of counter wheel 25 for one-tenth of a revolution thereafter, will be accompanied by rotation of said next adjacent counter wheel 50 for one-tenth of a revolution, since edge 23 confines pin 60 to the notch 58 adjacent thereto, and thereby drives said adjacent wheel 50 via this notch. After that, further rotation of counter wheel 25 will continue without rotation of said next adjacent counter wheel 50 for nine-tenths of a revolution of member 25. It will be noted that the angle which separates the pin 60 from where it is in position to start by-passing the bump to the position where it has by-passed the bump is one-tenth of a revolution.

Thus, for every complete revolution of member 25, the first counter wheel 50 moves through one-tenth of a revolution. For every full revolution of the first counter wheel 50, the counter wheel next adjacent thereto rotates through one-tenth of a revolution. Thus a full revolution of each counter wheel, except the last one, is accompanied by one-tenth of a revolution of the next adjacent counter wheel.

The springs 34 and balls 35 keep the counter wheels from being carried around except when a pin 60 is moving over a hump 22, and act as a click-stop means.

Gear 27 may mesh with a gear 70 fixed to a screw shaft 71 engaging a nut 72 maintained against rotation by a fixed key 73 received in a keyway 74 of said nut. Thus the count on the counter is indicated by the position of the nut, and a suitable scale may be provided for a reading of position of the nut.

While the drawings show only one pin 60 associated with each counter wheel, there may be more than one pin to move each counter wheel more than one-tenth of a revolution for each revolution of a preceding counter wheel. Also, each cam 19 may have more than one hump 22.

Also the counter may operate switches 75 in a circuit 76, or any other movable members, if desired.

In FIGS. 4 and 5 there is shown a shaft indexing mechanism 10a embodying a modified form of the invention.

Said mechanism 10a comprises an input member 79. Said input member 79 comprises an input shaft 80. Said shaft 80 may have outer threads 81 received in a nut 82 formed with a longitudinal keyway 83 receiving a longitudinal fixed key 83a, so that rotation of shaft 80 will correspond to linear movement of nut 82.

Shaft 80 is journaled in a bearing or bushing 90 fixed in an opening 91 of end wall 92 of a block or fixed housing 93. Said housing 93 may be formed with a cylindrical longitudinal bore 94. Within said bore 94 are ringlike bearings or bushings 95 and 96. Extending from one end of shaft 80 and disposed within the bore 94 is a web 97 provided at its outer end with an annular flange 98. A thrust bearing 100 is interposed between bearing 90 and web 97 and surrounds the shaft 80. Said thrust bearing 100 may overlap wall 92. Flange 98 may be formed at its outer periphery and adjacent web 97 with sixteen notches 102 for the purpose hereinafter appearing.

Flange 98 is formed with a through opening 103 in which is received a ball 104. Block or fixed housing 93 is formed with a radial through bore 105 in which is fixed a cam pin 106 projecting upwardly beyond the inner surface of bore 94 but terminating short of flange 98. Bearing 95 is notched as at 95b to clear pin 106. The ball 104 may rest on the top, slightly concave surface 107 of cam pin 106. When the ball 104 rests on top of the cam pin 106, it projects upwardly and radially inwardly beyond the inner surface 98a of flange 98, for the purpose hereinafter appearing.

Housing 93 is formed with a radial opening 110 aligned in the plane of the notches 102. Within the bore 110 is a detent pin 111 pressed downwardly by a coil compression spring 112 interposed between said pin and a cap screw 113 screwed to the upper screw threaded end 114 of the bore 110. The lower end of pin 111 is rounded and said pin serves to index the shaft 80 and its flange 98.

Although the drawing shows sixteen equiangular spaced indexing notches 102, any suitable number of such notches may be provided.

Web 97 is formed at its inner side with a central counter-bore 115 in which is mounted a thrust bearing disc 116. It will be noted that flange 98 is journaled in bearing 95. Journaled in the bearings 95, 96 is a wheel 120. Said wheel 120 comprises an outer flange 121 rotatably mounted within said bearings 95, 96. At one end of the flange 121 is a web 122 from which extends a hub 123 projecting into and disposed within flange 98. The end surface 124 of hub 123 contacts thrust bearing 116. Said hub 123 is formed at its outer periphery with sixteen notches 125.

There are the same number of notches 125 as there are notches 102. The notches 125 are V shaped and equiangularly spaced. When the ball 104 rests on surface 107 of cam pin 106 it projects into one of the notches 125 so that rotation of the shaft 80 is accompanied by rotation of member 120 while the ball is pushed up into a notch 125 by cam pin 106. However, when the ball 104 bypasses the cam pin 106 the ball will drop onto the inner surface of the bore 94 and rotation of shaft 80 will be accomplished without rotating member 120. Except when pushed into a notch 125 by the pin 106, the ball 104 is free to move within bore 103 and hence does not drive the next adjacent stage.

Block or housing 93 is formed with a second radial bore 110a similar to the bore 110 for receiving a detent or indexing pin 111a pressed down by spring 112a within said bore 110a. Spring 112a is held by a screw 113a screwed within the upper threaded opening 114a of said bore 110a. Thus the detent 111a holds member 120 against rotation except when the latter is being rotated by shaft 80. Detent 111a passes through a hole 95a in bearing or bushing 95, and engages notches 102a.

The drawing shows a cover 130 bolted to the fixed housing 93 by bolts 131. An output member 132 comprising an output shaft 133 passes through a central bearing 134 in said cover 130. Extending from the output shaft 133 is a hub 123a similar to hub 123 and formed with external notches 125a and with an end surface 124a contacting a thrust bearing 116a received in a counterbore 115a of member 120. Said housing 93 is formed with a second radial opening 105a similar to opening 105 and receiving a cam pin 106a to press a ball 104a in opening 103a up into one of the notches 125a. Bearing 95 is notched as at 95c, and bearing 96 is notched as at 96a, to pass pin 106.

A thrust bearing 140 surrounding the shaft 133 is interposed between the hub 123a and the cover 130.

While FIGS. 4 and 5 discloses only one counter wheel 120 interposed between the input member 79 and the output member 132, it will be understood that a series of counter wheels may be interposed, each one controlled by cooperating cam pin 106a and ball 104a.

Each of the flanges 98 and 121 may be provided with more than one through opening 103, 103a respectively, each receiving a ball 104, 104a. Furthermore, the housing may be provided with a plurality of openings 105, 105a to receive cam pin 106, 106a for acting on the balls 104, 104a respectively.

A switch actuating pin 150 is fixed to a detent 151 slidable in a radial bore 152 formed in housing 93 in 90° spaced relation from bore 110. A coil compression spring 154 surrounds pin 150 and is located in the bore 152 and presses on detent 151, and is interposed between said detent 151 and a cap or cover 156 fixed in any suitable manner to the outside of the housing and closing opening or bore 152. Said cover or cap 156 has a central hole through which pin 150 passes. The detent 151 may project into notches 102. Thus as the input member 79 is rotated, switch actuating pin 150 will be actuated a number of times corresponding to the number of indexed positions through which the input member passes. This motion of detent 151 can be used to operate a switch or for similar purposes. Further, detent 151 can also serve the function of detent 111, and therefore detent 111 may be eliminated.

In FIG. 1a there is shown part of a counter 10b similar to the counter 10 of FIGS. 1 to 3 except for the changes hereinafter set forth. Counter 10b comprises a first counter or indexing wheel or member 25a corresponding to and similar to member 25 of FIGS. 1 to 3, except that the slot 38 of member 25 is replaced by a radial slot or groove 176 having quarter spherical outer and inner ends and a portion therebetween of semi-cylindrical shape.

In counter 10b, furthermore, counter members 50 are replaced by counter members 177, each formed with a flange 177a corresponding to flange 53 of each member 50. The side of each member 177 which has the flange 177a is formed with a depressed portion 178 provided with wedge shaped notches corresponding to the notches 58, except that the apices which correspond to the apices 59 are quarter spherical in shape. The depth of depressed portion 178 is similar to the depth of groove 176. The pin 60 of counter 10 is replaced by a ball 175 in counter 10b, and said ball projects half into slot or groove 176 and half into depression 178. The operation of counter 10b is the same as of counter 10. The cams 19 control the balls 175 in the same manner as the cam 19 of counter 10 controls the pin 60.

It will thus be seen that there is provided an apparatus in which the several objects of this invention are achieved, and which is well adapted to meet the conditions of practical use.

As possible embodiments might be made of the above invention, and as various changes might be made in the embodiments above set forth, it is to be understood that all matter herein set forth or shown in the accompanying drawings, is to be interpreted as illustrative and not in a limiting sense.

I claim:

In combination, a fixed member, a driving wheel rotatably mounted thereon, a driven wheel rotatably mounted on said fixed member for rotation coaxially of said driving wheel, and means including a cam on the fixed member, and a movable member movable radially on said driving wheel and rotating with said driving wheel, and a plurality of equiangularly spaced means on said driven wheel releasably and selectively engageable with said movable member, to cause the driven wheel to be rotated through one predetermined angle for each rotation of the driving wheel through another predetermined angle, said driving wheel being formed with a radial opening, said movable member being movable in said radial opening, said cam including a camming portion to move said movable member radially in said radial opening and into engagement with one of said equiangularly spaced means on said driven wheel, said movable member contacting said wheels and cam only, said movable member being free to move radially when not in contact with said camming portion, said fixed member comprising a housing formed with a cylindrical cavity, said wheels being within said cavity, said movable member comprising a ball, said radial opening being formed in an annular flange on said driving wheel, said means on said driven wheel comprising a portion positioned within said flange and formed with notches in the plane of said ball, and said cam means being positioned externally of said flange and said ball.

References Cited by the Examiner

UNITED STATES PATENTS

| 86,763 | 2/1869 | Koch et al. | 235—117 X |
|---|---|---|---|
| 232,983 | 10/1880 | Lautenschlager | 235—142 X |
| 400,406 | 3/1889 | Kolb | 235—142 X |
| 480,208 | 8/1892 | Nichols | 235—142 X |
| 868,981 | 10/1907 | Gordon. | |
| 997,648 | 7/1911 | Cavanagh et al. | |
| 1,204,284 | 11/1916 | Lawrence. | |
| 1,216,117 | 2/1917 | Heath | 235—124 |

FOREIGN PATENTS 531,638   1/1941   Great Britain.

RICHARD B. WILKINSON, *Primary Examiner.*

LEO SMILOW, LOUIS J. CAPOZI, *Examiners.*

C. G. COVELL, JAMES G. MURRAY,
*Assistant Examiners.*